US010365096B2

(12) United States Patent
Verhaeghe et al.

(10) Patent No.: US 10,365,096 B2
(45) Date of Patent: Jul. 30, 2019

(54) BALE MEASUREMENT SYSTEM AND METHOD FOR A RECTANGULAR BALER

(71) Applicant: CNH Industrial America LLC, New Holland, PA (US)

(72) Inventors: Didier Verhaeghe, Ypres (BE); Tom Coen, Zemst (BE)

(73) Assignee: CNH Industrial America LLC, New Holland, PA (US)

( * ) Notice: Subject to any disclaimer, the term of this patent is extended or adjusted under 35 U.S.C. 154(b) by 41 days.

(21) Appl. No.: 15/038,249

(22) PCT Filed: Nov. 20, 2014

(86) PCT No.: PCT/EP2014/075136
§ 371 (c)(1),
(2) Date: May 20, 2016

(87) PCT Pub. No.: WO2015/075119
PCT Pub. Date: May 28, 2015

(65) Prior Publication Data
US 2016/0290798 A1 Oct. 6, 2016

(30) Foreign Application Priority Data

Nov. 22, 2013 (BE) .................................. 2013/0787

(51) Int. Cl.
G01B 21/06 (2006.01)
A01F 15/08 (2006.01)
(Continued)

(52) U.S. Cl.
CPC ............ *G01B 21/06* (2013.01); *A01F 15/042* (2013.01); *A01F 15/0825* (2013.01); *A01F 15/145* (2013.01)

(58) Field of Classification Search
CPC ............ A01F 15/0715; A01F 2015/076; A01F 15/0825; A01F 15/0833; A01F 15/0841;
(Continued)

(56) References Cited

U.S. PATENT DOCUMENTS 5,783,816 A * 7/1998 McPherson ......... A01F 15/0858
100/4
6,248,963 B1 * 6/2001 Gottlober ............ A01F 15/0825
177/136
(Continued)

FOREIGN PATENT DOCUMENTS

EP 0752204 A1 1/1997
EP 0983721 A1 3/2000
(Continued)

OTHER PUBLICATIONS

PCT/EP2014/075136, International Search Report, dated Feb. 25, 2015, 4 pages.
(Continued)

Primary Examiner — Duy T Nguyen
(74) Attorney, Agent, or Firm — Peter K. Zacharias; Patrick M. Sheldrake

(57) ABSTRACT

A bale measuring method for a rectangular baler having a bale chamber in which bales are formed. The bale measuring method includes steps of measuring a movement of crop material downstream of the bale chamber as the crop material moves backward in the baler, using the measured movement of the crop material downstream of the bale chamber to calibrate a measurement and calculation tool for measuring a movement of crop material in the bale chamber and for calculating a length of a bale being formed in the bale chamber based on the measurement, and determining the length of the bale being formed in the bale chamber
(Continued)

using the calibrated measurement and calculation tool as the bale moves backward in the baler.

14 Claims, 4 Drawing Sheets

(51) Int. Cl.
*A01F 15/14* (2006.01)
*A01F 15/04* (2006.01)

(58) Field of Classification Search
CPC ...... A01F 15/148; A01F 15/042; A01F 15/14; A01F 15/145; A01F 2015/077; A01F 2015/0866; G01B 21/06; G01N 2009/024; G01N 9/00; G01N 9/02
USPC ........................................................ 702/163
See application file for complete search history.

(56) References Cited

U.S. PATENT DOCUMENTS

| | | | |
|---|---|---|---|
| 6,708,478 B1 * | 3/2004 | Mesmer | A01F 15/0858 100/3 |
| 7,140,170 B2 * | 11/2006 | Krone | A01F 15/0825 56/341 |
| 7,296,828 B2 | 11/2007 | Schoonheere et al. | |
| 8,141,480 B2 * | 3/2012 | Smith | A01F 15/0715 100/35 |
| 9,010,240 B2 * | 4/2015 | Missotten | A01F 15/0825 100/35 |
| 2006/0012176 A1 * | 1/2006 | Schoonheere | A01F 15/145 289/2 |
| 2014/0202343 A1 | 7/2014 | Van Amstel et al. | |
| 2014/0237981 A1 * | 8/2014 | Roberge | A01D 87/02 56/341 |

FOREIGN PATENT DOCUMENTS

| | | |
|---|---|---|
| EP | 1042950 A1 | 10/2000 |
| FR | 2676611 A1 | 11/1992 |
| FR | 2811654 A1 | 1/2002 |

OTHER PUBLICATIONS

PCT/EP2014/075136, Written Opinion, dated Feb. 25, 2015, 4 pages.

* cited by examiner

BALE MEASUREMENT SYSTEM AND METHOD FOR A RECTANGULAR BALER

CROSS REFERENCE TO RELATED APPLICATIONS

This application is the National Stage of International Application No. PCT/EP2014/075136 filed Nov. 20, 2014, which claims priority to Belgian Application No. 2013/0787 filed Nov. 22, 2013, the contents of which are incorporated herein by reference.

FIELD OF THE INVENTION

The present invention relates to a bale measuring method and system for a rectangular baler.

BACKGROUND OF THE INVENTION

Rectangular bales are able to maintain their shape by means of a series of parallel extending twine loops, provided lengthwise around the bales by means of a tying mechanism. Balers typically use a tying mechanism including automatic knotters by which e.g. two knots are made on every loop for binding a bale. An example of such a double knotter system for a baler is disclosed in US 2006/0012176 and in BE 2012/0697 in the name of the Applicant. The knotters are triggered to make a knot when a bale that is being formed in the bale chamber of the baler has reached a predetermined length. For measuring the length of the bale in the bale chamber length measurements are performed.

At present bale length measurements are performed using a star wheel engaging the crop material of a bale in the bale chamber. However, the parameters of the crop material, such as density, humidity, crop type, etc, may influence the amount of slip occurring as the star wheel rotates. Furthermore, depending on the parameters of the crop material, the crop material has the tendency to expand after compression. The slip of the star wheel and expansion of the crop material may lead to inaccurate measurement results.

SUMMARY OF THE INVENTION

The object of the present invention is to improve existing bale length measurement systems and methods, and in particular to provide a bale length measurement system and method which is well adapted to work with different crop material parameters.

According to an embodiment of the invention the bale measuring method for a rectangular baler comprises the following steps. A movement of crop material downstream of the bale chamber is measured as the crop material moves backward in the baler. The measured movement of crop material downstream of the bale chamber is used to calibrate a measurement and calculation tool, said measurement and calculation tool being adapted for measuring a movement of crop material in the bale chamber and for calculating a length of a bale being formed in the bale chamber based on said measurement. The length of the bale being formed in the bale chamber is determined using the calibrated measurement and calculation tool. Such an embodiment has the following advantages. The measurement of the movement of crop material downstream of the bale chamber will give an accurate indication of the movement of the crop material in the baler and can be used to calibrate a tool which measures the movement of crop material in the bale chamber. This measurement of the movement of crop material in the bale chamber may be influenced by crop material parameters, but by performing a calibration using a measurement of the movement of crop material downstream of the bale chamber, an accurate result can be obtained. In particular by a calibration using a measurement of the movement of crop material downstream of the bale chamber, expansion of crop material after being moved out of the bale chamber can be taken into account when calculating the length of a bale in the bale chamber while the bale is being formed. After leaving the bale chamber the bale expands. By taking this expansion into account when calculating the length of the bale in the bale chamber while the bale is being formed, the actual length of the bale after leaving the baler can be more accurately determined.

According to a preferred embodiment of the invention calibrating the measurement and calculation tool comprises determining at least one calibration parameter based on the measured movement of crop material downstream of the bale chamber and a movement of the crop material in the bale chamber measured by means of the measurement and calculation tool, and the length of a bale being formed in the bale chamber is determined using the at least one calibration parameter and a measured movement of crop material in the bale chamber. Determining the length of a bale being formed in the bale chamber by measuring the movement of the crop material in the bale chamber as the bale being formed moves backward in the bale chamber, is an effective way of determining the length of a bale being formed. In particular when the stream of crop material in the baler is continuous, the movement of the crop material downstream of the bale chamber can advantageously be used to calibrate the measurement of the movement of the crop material in the bale chamber, and thus to calibrate the calculation of the length of a bale being formed in the bale chamber.

In a preferred embodiment thereof said determining at least one calibration parameter is based on a comparison of the measured movement of crop material downstream of the bale chamber and a movement of the crop material in the bale chamber measured by means of the measurement and calculation tool, wherein said movements of the crop material downstream of the bale chamber and the crop material in the bale chamber are measured at the same time. This embodiment provides a particularly accurate way of determining at least one calibration parameter based on the measured movement of crop material downstream of the bale chamber and a movement of the crop material in the bale chamber measured by means of the measurement and calculation tool. In an advantageous embodiment thereof, the measurement of said movements of the crop material downstream of the bale chamber and the crop material in the bale chamber is started a predetermined time since the beginning of the formation of a bale in the bale chamber and is stopped when a predetermined value for the movement of the crop material downstream of the bale chamber or the crop material in the bale chamber is reached. In that way an accurate measurement of the movement of crop material may be obtained for calibrating the measurement and calculation tool, avoiding time zones surrounding the starting and finishing of a bale. In the time zones surrounding the starting and finishing of a bale, the crop material may move as a result of activities such as knotting in a way that an accurate comparison of the movement of the crop material in the bale chamber and the movement of the crop material downstream of the bale chamber is not possible. In an alternative embodiment the movement of the movements of crop material downstream of the bale chamber and the crop material in the bale chamber are measured between a first time corresponding with a first number of strokes performed by the baler since the beginning of the formation of the bale, and a second time corresponding with a second larger number of strokes performed by the baler since the beginning of the formation of the bale. This way it is also possible to effectively avoid the time zones surrounding the starting and finishing of a bale.

Furthermore, it is preferred to measure the movement of crop material downstream of the bale chamber and measure the movement of the crop material in the bale chamber while the bale that is about to leave the bale chamber is still firmly held in the bale chamber. This way the measurements are not influenced by possible nonrepresentative movements of the crop material at the moment the bale leaves the bale chamber.

In an alternative embodiment of the method according to the invention in which said at least one calibration parameter is based on the measured movement of crop material downstream of the bale chamber and a movement of the crop material in the bale chamber measured by means of the measurement and calculation tool, the at least one calibration parameter is based on comparison of the calculated length of a bale in the bale chamber and the length of said bale downstream of the bale chamber. In such an embodiment:

by means of the measurement and calculation tool a length is calculated of a first bale being formed in the bale chamber;

said measuring a movement of crop material downstream of the bale chamber is performed on said first bale as said first bale moves backward in the baler;

said measured movement of said first bale downstream of the bale chamber is used to calculate a length of said first bale downstream of the bale chamber;

calibrating the measurement and calculation tool comprises determining at least one calibration parameter based on a comparison of the calculated length of the first bale in the bale chamber with the calculated length of the first bale downstream of the bale chamber;

said determining the length of a bale being formed in the bale chamber using the calibrated measurement and calculation tool is performed on a second bale being formed in the bale chamber. This alternative way of calibration requires determination of the beginning and end of the first bale downstream of the bale chamber. This can be achieved with suitable sensors, such as optical sensors and the like.

According to a preferred embodiment of the invention the movement of crop material downstream of the bale chamber is measured at different positions on the crop material. This makes it possible to perform a number of simultaneous measurements at different positions and to use an average value for measuring the movement of crop material downstream of the bale chamber. This way the influence of local irregularities in the crop material can be diminished. Furthermore, measuring at different positions on the crop material, in particular at opposite sides of the bale, makes it possible to measure a possible curvature of the bale that may be the result of a nonhomogeneous filling of the bale chamber during the formation of the bale.

According to a preferred embodiment of the invention the method further comprises triggering a tying mechanism of the baler when the determined length of the bale reaches a predetermined value. Because the length of the bale can be determined in an accurate way, also the triggering of the tying mechanism can be done in an improved way.

According to another aspect of the invention, there is provided a bale measuring system for a rectangular baler comprising a downstream crop material measurement system and a measurement and calculation tool. The downstream crop material measurement system is adapted for measuring a movement of crop material downstream of the baling chamber. The measurement and calculation tool is adapted for measuring a movement of the bale in the bale chamber; for determining at least one calibration parameter using the movement of the crop material downstream of the bale chamber as measured by the downstream crop material measurement system and a measured movement of the crop material in the bale chamber; and for determining the length of a bale being formed in the bale chamber using the at least one calibration parameter and a measured movement of crop material in the bale chamber. Preferably, the measurement and calculation tool comprises a processor for determining said at least one calibration parameter and for determining said length of a bale being formed in the bale chamber.

According to a preferred embodiment of the invention the downstream crop material measurement system comprises for measuring a movement of crop material downstream of the bale chamber a calibration wheel which is adapted to engage the crop material downstream of the bale chamber and to rotate as crop material is being moved downstream of the bale chamber. The downstream crop material measurement system further comprises a sensor adapted for measuring the rotation of the calibration wheel. The sensor can be any suitable sensor, e.g. a rotary encoder, a hall effect sensor, an optical sensor, a mechanical or electrical counter, etc. Such a wheel which engages the crop material and rotates as crop material is being moved which allows for measuring the movement of crop material downstream of the baling chamber based on the number of rotations of the calibration wheel.

According to a preferred embodiment of the invention the crop material measurement system comprises a plurality of calibration wheels arranged at different positions downstream of the bale chamber. This makes it possible to perform a number of simultaneous measurements at different positions and to use an average value for measuring the movement of crop material downstream of the bale chamber.

According to a preferred embodiment of the invention, for measuring a movement of crop material in the bale chamber, the measurement and calculation tool comprises a measuring wheel which is adapted to engage the crop material in the bale chamber and to rotate as crop material is being moved in the bale chamber. The measurement and calculation tool further comprises a sensor adapted for measuring the rotation of the measuring wheel. Preferably, the measurement and calculation tool further comprises a processor adapted for determining the length of the bale being formed in the bale chamber based on the measured rotation and the at least one calibration parameter. The sensor can be any suitable sensor, e.g. a rotary encoder, a hall effect sensor, an optical sensor, a mechanical or electrical counter, etc.

According to a preferred embodiment of the invention the bale measuring system is for use in a baler with a tying mechanism, and further comprises a triggering means adapted for triggering the tying mechanism of the baler when the calculated length of the bale being formed in the bale chamber reaches a predetermined value.

Finally according to another embodiment of the invention, there is provided a baler including an embodiment of a bale measuring system as disclosed above.

BRIEF DESCRIPTION OF THE DRAWINGS

The advantages of this invention will be apparent upon consideration of the following detailed disclosure of exemplary non-limiting embodiments of the invention, especially when taken in conjunction with the accompanying drawings wherein.

DETAILED DESCRIPTION OF PREFERRED EMBODIMENTS

Many of the fastening, connection, processing and other means and components utilized in this invention are widely known and used in the field of the invention described, and their exact nature or type is not necessary for an understanding and use of the invention by a person skilled in the art, and therefore they will not be discussed in significant detail.

Figure 1:
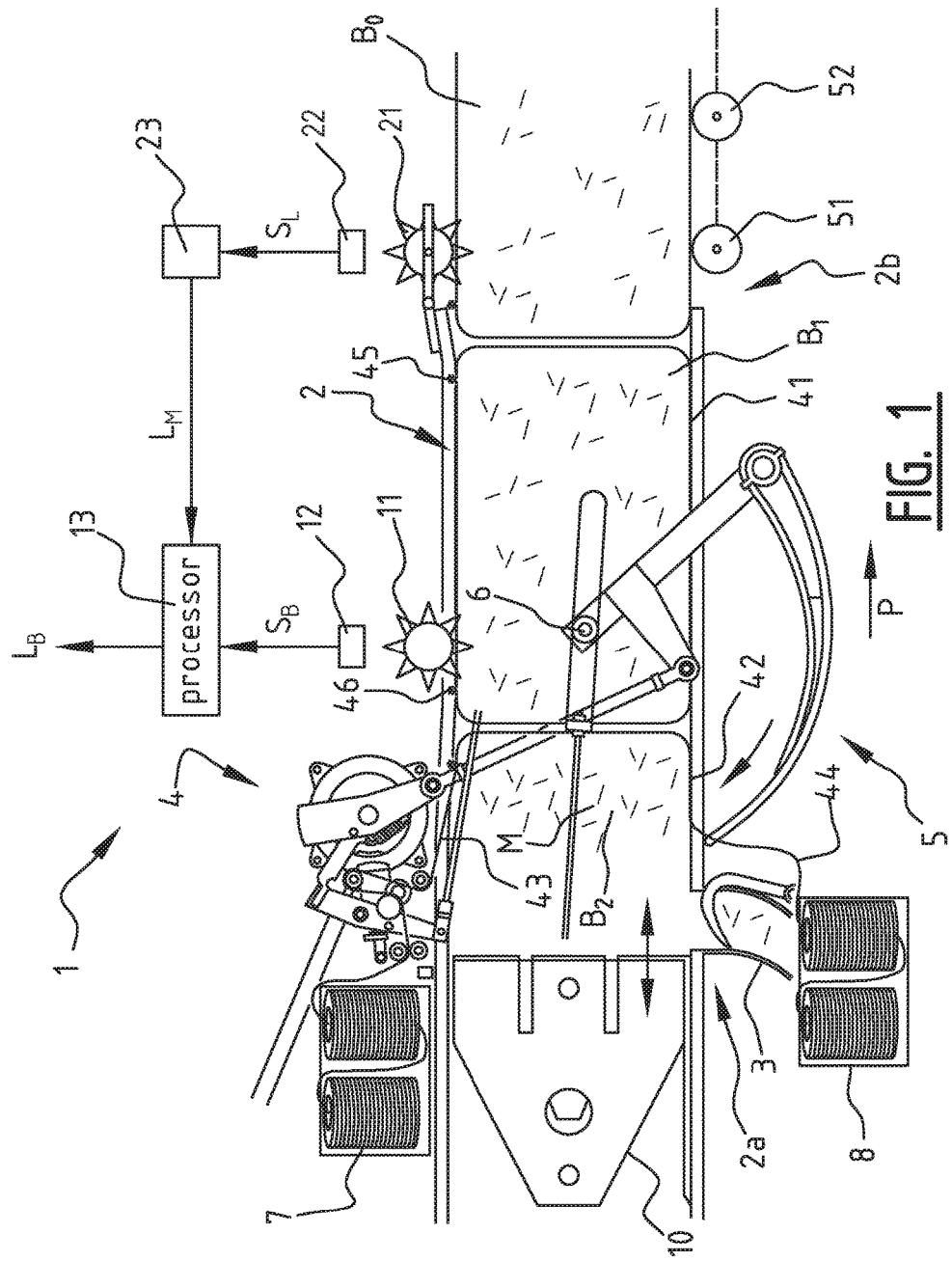
FIG. 1 is a schematic view of a baler having a double knotter tying mechanism and comprising an embodiment of a bale measuring system of the invention.

The baler illustrated in FIG. 1 has a rectangular bale case 1 that is supported by ground wheels (not shown). The bale case 1 defines a bale chamber 2 wherein crop material M is pushed in through a curved duct 3. A plunger 10 reciprocates within the bale case 1 to intermittently pack fresh charges of crop material from the duct 3 at the upstream end 2a of the bale chamber 2 rearward in the direction of the arrow P towards the downstream end 2b of the bale chamber 2. When the bale reaches a predetermined size, a tying mechanism with a set of needles 5 is activated. As will be appreciated, the tying mechanism comprises a set of individual knotters 4 provided crosswise on top of the bale case 1 at intervals. Each knotter 4 has an associated needle 5 for assisting in forming an individual loop around a finished bale $B_0$, $B_1$. In FIG. 1 also a bale $B_2$ is shown that is in the process of being formed. When the bale $B_2$ needs tying, the knotters 4 and their needles 5 are driven to initiate the tying operation. The knotter 4 may be similar in many respects to the knotter disclosed in US 2006/0012176 in the name of the Applicant or in BE 2012/0697, the disclosure of which is herein incorporated by reference.

Figure 2A:
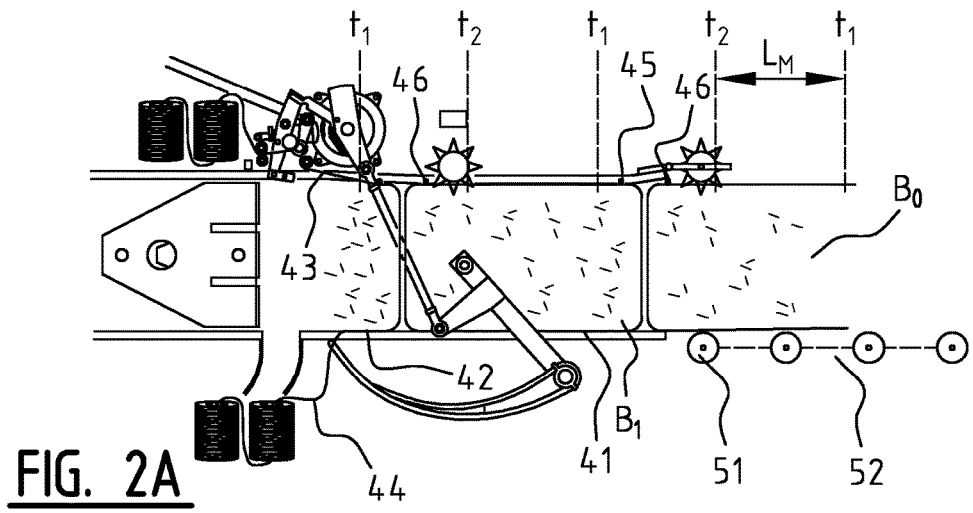
FIGS. 2A-2C illustrate three consecutive steps in the baler of FIG. 1, as a bale is being formed in the bale chamber.
Figure 2B:
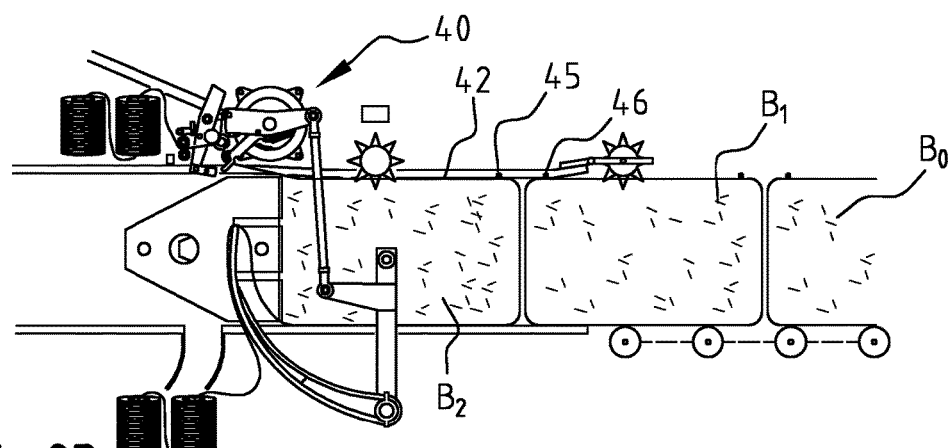
Figure 2C:
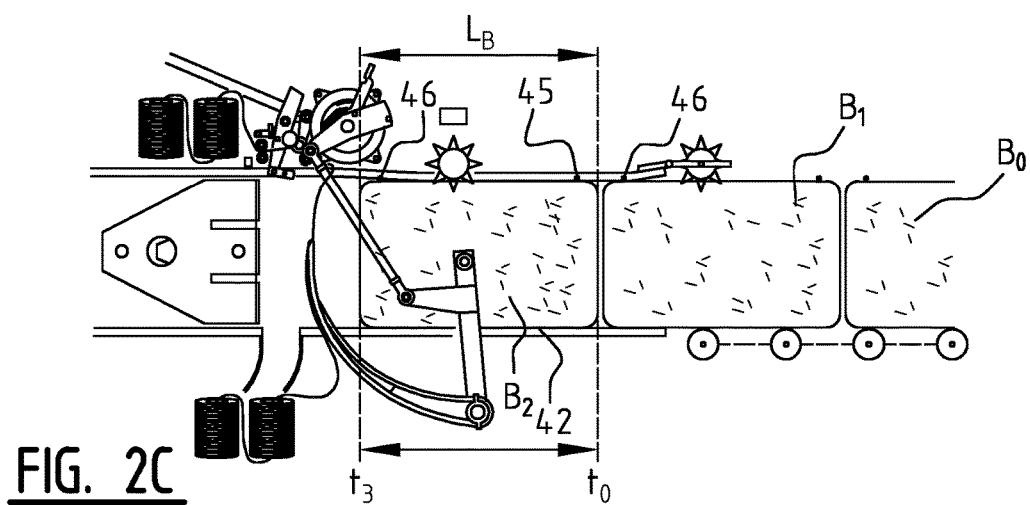

The needle 5 is swingably mounted on the bale case 1 by a pivot 6 and is swung back and forth across the bale chamber 2, see FIGS. 2A-2C, between an "at-home" or rest position fully below the bale case 1 and a "full-throw" position extending completely across the bale case 1. With reference to FIGS. 1 and 2, to the left of loop 41 is a partial loop 42 which is in the process of being formed. The top strand 43 emanates from a source of twine supply 7, while the bottom strand 44 emanates from a second source of twine supply 8. In FIG. 2B, a first knot 45 of bale $B_2$ is in existence, and the bale $B_2$ is approaching a length where the needle 5 is swinging into operation and presents the strands 43 and 44 to the knotter 4 to start an operation cycle in which two consecutive knots are being formed. In a finished bale $B_0$, $B_1$, the loop 41, 42 is made from two strands of binding material, i.e. one strand 43 along the top side of the bale and a second strand 44 along the bottom side of the bale and its two opposite, vertical ends.

In a baler, it is desirable to measure the length of a bale that is formed. FIG. 1 illustrates a bale measuring system according to an embodiment of the present invention. The bale measuring system comprises a downstream crop material measurement system 21, 22, 23 as well as a measurement and calculation tool 11, 12, 13 for calculating the length of the bale $B_2$ being formed in the bale chamber 2.

The downstream crop material measurement system can be any suitable system, and typically includes a calibration star wheel 21, a sensor 22, and a processing part 23.

The calibration star wheel 21 is mounted in such a way that it engages the crop material M and rotates as crop material M is being moved downstream of the bale chamber 2 over rollers 51, 52 of a bale chute. The calibration star wheel 21 is rotatably mounted on a shaft extending in a lateral direction of the baler. The teeth of the calibration star wheel 21 impinge the adjacent crop material of a bale B0 downstream of the bale chamber 22. Thus the calibration star wheel 21 is driven by the forward and backward movement of a bale $B_0$ downstream of the bale chamber 2.

The sensor 22 is adapted for measuring the rotation of the calibration star wheel 21. The calibration star wheel sensor 22 can be any suitable sensor, and can be e.g. a rotary encoder, a hall effect sensor, an optical sensor, a mechanical or electrical counter, etc. The signal $S_L$ measured by the sensor 22 is sent to the processing part 23 which is adapted to determine the amount of movement $L_M$ of the crop material downstream of the bale chamber 2.

The measurement and calculation tool comprises a bale length measurement star wheel 11 which is mounted in such a way that it engages the crop material M and rotates as crop material M is being moved in the bale chamber 2. A sensor 12 is adapted for measuring the rotation of the bale length measurement star wheel 11. The star wheel sensor 12 can be any suitable sensor, and can be e.g. a rotary encoder, a hall effect sensor, an optical sensor, a mechanical or electrical counter, etc. Further, the measurement and calculation tool comprises a processor 13 processing the signals $S_B$ received from star wheel sensor 12 and the output $L_M$ from processing part 23.

The processor 13 is adapted for determining at least one calibration parameter using the measured movement $L_M$ of the crop material M downstream of the bale chamber 2 and the measured signals $S_B$ received from the star wheel sensor 12. A calibration parameter C can e.g. be determined using the following equation:

$$[L_M]_{t1,t2} = [\text{\#counted teeth star wheel } 11]_{t1,t2} * C$$

The skilled person understands that it is possible to perform a number of consecutive measurements and to use an average value.

After determining the calibration parameter, the length of a bale can be determined by counting the number of teeth during a time period [t0, t3] which corresponds with the beginning and the end of the formation of a bale:

$$L_B = [\text{\# of counted teeth star wheel } 11]_{t0,t3} * C$$

In practice, after calibration, the movement of crop material in the bale chamber is continuously measured. When a desirable bale length is reached, the tying mechanism is triggered and two consecutive knots are formed.

The bale length measurement star wheel 11 is rotatably mounted on a shaft extending in a lateral direction of the baler. The teeth of the bale length measurement star wheel 11 impinge the adjacent crop material of a bale. Thus the star wheel is driven by the forward and backward movement of a bale in the bale chamber.

Figure 3:
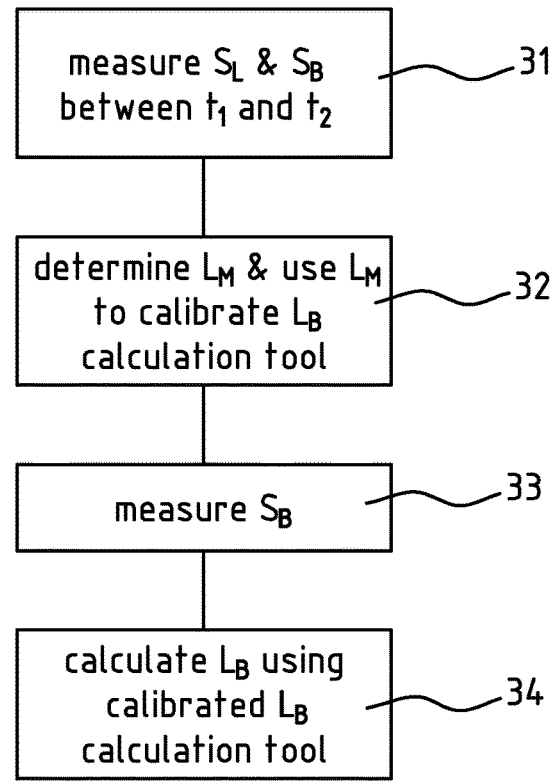
FIG. 3 is a flow chart illustrating an embodiment of the method of the invention.

FIG. 3 illustrates schematically an embodiment of a bale measuring method for a rectangular baler. In a first step 31 the movement of the crop material M downstream of the bale chamber 2 is sensed, e.g. through signals $S_L$ measured by sensor 22, and the movement of the crop material M of the bale being formed in the bale chamber 2 is sensed, e.g. through signals $S_B$ measured by sensor 12, between time t1 and t2. In a second step 32 the total measured movement $L_M$ of the crop material M downstream of the bale chamber 2 and the total measured movement of the crop material M in the bale chamber 2 is compared to calibrate a measurement and calculation tool for measuring a movement of the bale being formed in the bale chamber 2. In a third step 33 the calibrated measurement and calculation tool is used to measure the movement of the crop material M of a bale being formed in the bale chamber, e.g. through signals $S_B$ measured by sensor 12, and in a fourth step 34 the length of the bale ($L_B$) is determined using the calibrated measurement and calculation tool.

In the examples given above one calibration parameter is determined. However the skilled person will understand that other models are possible to relate the measurement of the movement ($L_M$) of the crop material M downstream of the bale chamber 2 to the measurement of the movement of the crop material in the bale chamber 2 (e.g. the number of counted teeth of the bale length measurement star wheel 11) using more than one calibration parameter and/or using a non-linear relationship between the movement of the crop material M downstream of the bale chamber 2 ($L_M$) and the measurement of the movement of the crop material M of the bale being formed in the bale chamber 2 (e.g. the number of counted teeth of the bale length measurement star wheel 11).

Instead of calibrating the measurement and calculation tool based on movement of the crop material in the bale chamber and movement of the crop material downstream of the bale chamber, it is possible to first calculate a length of a first bale being formed in the bale chamber by means of the measurement and calculation tool; to subsequently determine the length of said first bale using said downstream crop material measurement system (21, 22, 23) as the first bale moves backward in the baler; and to calibrate the measurement and calculation tool on the basis of comparison of the calculated length of the first bale in the bale chamber and the determined length of the first bale downstream of the bale chamber. The calibrated measurement and calculation tool can subsequently be used to determine the length of a second bale being formed in the bale chamber.

Figure 4:
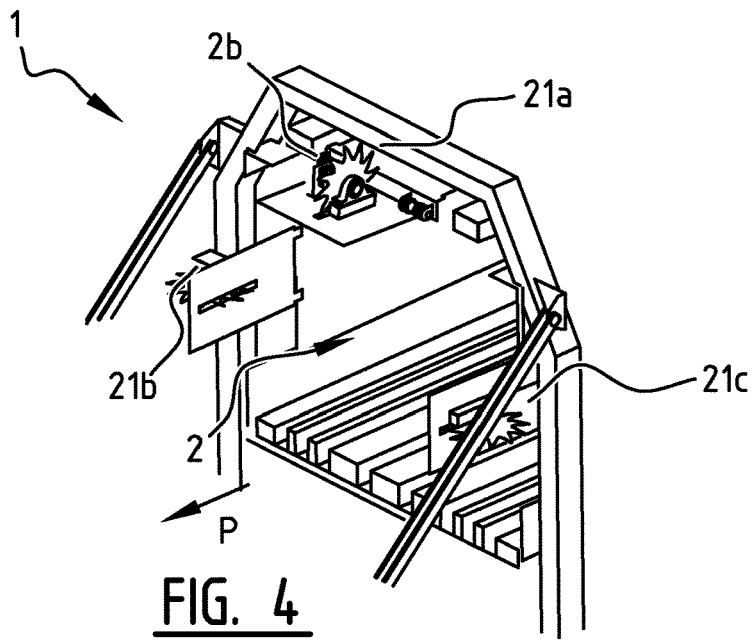
FIG. 4 is a view in perspective of the downstream end of the bale chamber of a baler comprising an alternative embodiment of the bale measuring system of the baler shown in FIG. 1.

In FIG. 4 the downstream end 2b of the bale chamber 2 of the baler 1 is shown comprising an alternative embodiment of the bale measuring system. In the shown embodiment a plurality of calibration star wheels 21a, 21b, 21c is arranged at different positions along the circumference of the downstream end 2b of the bale chamber 2. One calibration star wheel 21a engages the top of a bale coming out of the bale chamber 2, the other calibration star wheels 21b, 21c engage opposing sides of a bale coming out of the bale chamber 2. In the shown embodiment it is possible to perform a number of simultaneous measurements at different positions and to use an average value of rotations of the calibration star wheels 21a, 21b, 21c for measuring the movement of crop material M downstream of the bale chamber 2. Alternatively, more than one calibration star wheel 21 is arranged to engage a respective surface of the bale. Furthermore, only the calibration star wheels 21b and 21c may be provided such that only the side surfaces of the bale are engaged by calibration wheels, or only two or more calibration star wheels 21a may be provided such that only the top surface of the bale is engaged by calibration wheels.

Figure 5:
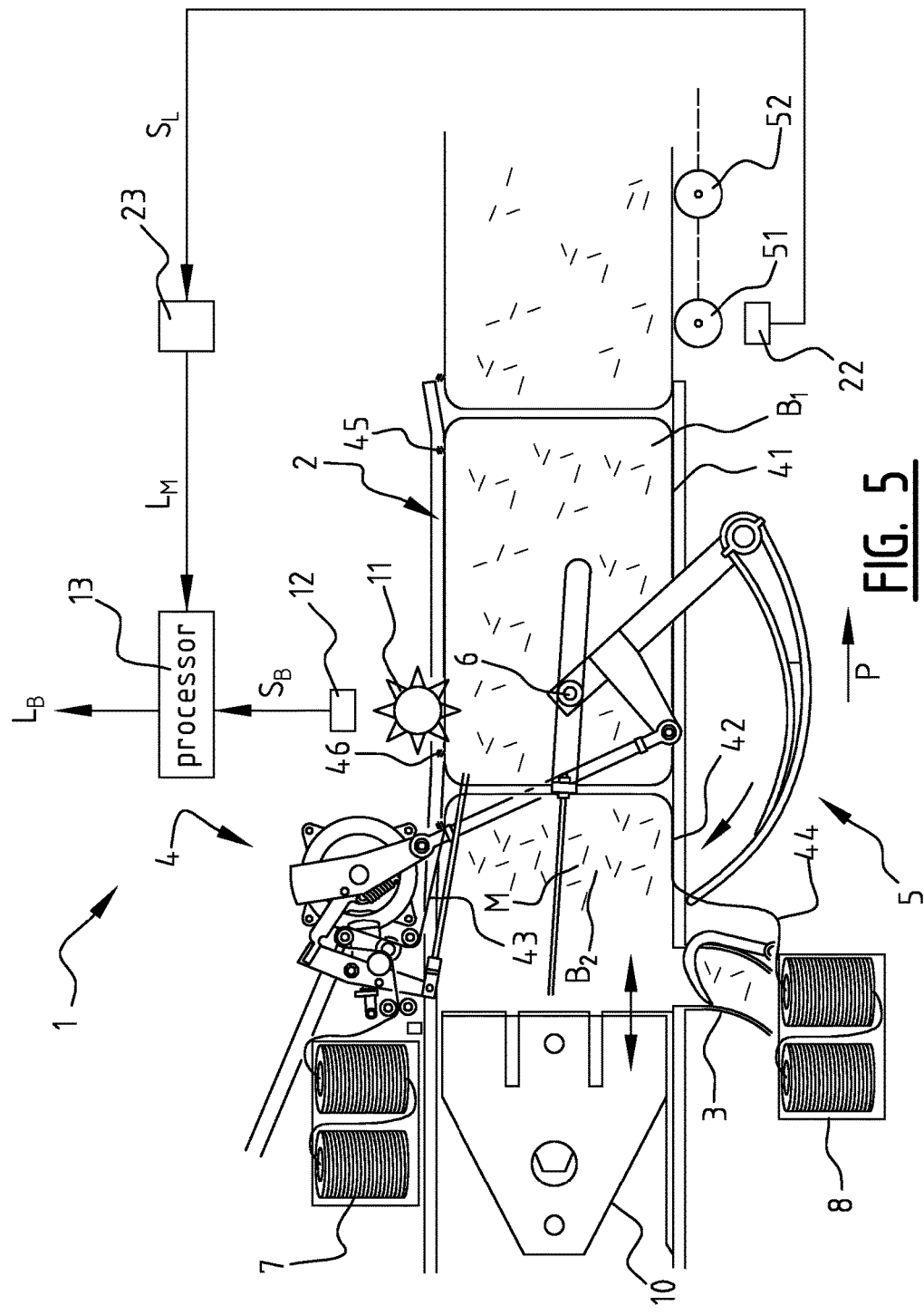
FIG. 5 is a schematic view of the baler as shown in FIG. 1 having an alternative embodiment of the bale measuring system.

In FIG. 5 a further alternative embodiment is shown of the bale measuring system of the baler as shown in FIG. 1. In this embodiment the movement of the crop material M downstream of the bale chamber 2 is measured based on the rotation of a roller 51 of the bale chute over which the crop material M coming out of the bale chamber 2 is moved.

Alternatively, the movement of the crop material M downstream of the bale chamber 2 can be measured by means of an optical sensor.

In the figures a single calibration star wheel 21 is positioned at the top of the bale chamber. This calibration star wheel 21 can advantageously be arranged in line with the measurement star wheel 11. However, in case the measurement star wheel 11 damages the surface of the bale, calibration star wheel 21 can advantageously be offset relative to the measurement star wheel 11, such that the calibration star wheel 21 does not engage the bale at a position on the surface of the bale that was previously engaged and possibly damages by the measurement star wheel 11.

Without loss of generality, the calculation of the calibration parameter may be repeated for every new bale that is being formed, or for every two or three bales. Also, the calibration parameter may be recalculated whenever a new twine roll is installed or whenever a new baling session is started. Further, it is possible to allow an operator to request a new calibration.

While the principles of the invention have been set out above in connection with specific embodiments, it is to be understood that this description is merely made by way of example and not as a limitation of the scope of protection, which is determined by the appended claims.

The invention claimed is:

1. A bale measuring method for a rectangular baler having a bale chamber in which bales are formed, comprising the steps of:
    continuously measuring a movement of crop material downstream of the bale chamber by a rotatable device engaging the crop material as the crop material moves backward in the baler;
    calibrating a measurement and calculation tool using the measured movement of the crop material downstream of the bale chamber, the measurement and calculation tool for measuring a movement of crop material in the bale chamber and for calculating a length of a bale being formed in the bale chamber based on the continuous measured movement of crop material in the bale chamber by a rotatable device engaging the crop material, wherein the step of calibrating the measurement and calculation tool comprises determining at least one calibration parameter based on the measured movement of the crop material downstream of the bale chamber and the measured movement of the crop material in the bale chamber;
    determining the length of the bale being formed in the bale chamber using the calibrated measurement and calculation tool using the at least one calibration parameter and the measured movement of the crop material in the bale chamber; and
    triggering a tying mechanism of the baler when the length of the bale being formed in the bale chamber reaches a predetermined value.

2. The method of claim 1, wherein the step of determining at least one calibration parameter is further based on a comparison of the measured movement of the crop material downstream of the bale chamber and the measured movement of the crop material in the bale chamber, wherein the movements of the crop material downstream of the bale chamber and the crop material in the bale chamber are measured at the same time.

3. The method of claim 2, wherein the measurement of the movements of the crop material downstream of the bale chamber and the crop material in the bale chamber is started a predetermined time since a beginning of formation of the bale in the bale chamber and is stopped when a predetermined value for the movement of the crop material downstream of the bale chamber or the crop material in the bale chamber is reached.

4. The method of claim 2, wherein the movements of the crop material downstream of the bale chamber and the crop material in the bale chamber are measured between a first time corresponding to a first number of strokes performed by the baler since a beginning of formation of the bale, and a second time corresponding to a second larger number of strokes performed by the baler since a beginning of the formation of the bale.

5. The method of claim 1, wherein:
the step of measuring the movement of the crop material downstream of the bale chamber comprises measuring a movement of a first bale downstream of the bale chamber as the first bale moves backward in the baler;
the steps of determining comprises calculating, using the calibrated measurement and calculation tool, a length of the first bale downstream of the bale chamber based on the measured movement of the first bale downstream of the bale chamber;
the step of calibrating the measurement and calculation tool comprises determining at least one calibration parameter based on a comparison of the determined length of the first bale in the bale chamber with the calculated length of the first bale downstream of the bale chamber; and
the step of determining further comprises a step of calculating a length of a second bale being formed in the bale chamber using the calibrated measurement and calculating tool.

6. The method according to claim 1, wherein the step of measuring the movement of the crop material downstream of the bale chamber is performed at different positions on the crop material.

7. A bale measuring system for a rectangular baler having a bale chamber in which bales are formed in a direction from an upstream end towards and through a downstream end of the bale chamber, the system comprising:
a downstream crop material measurement system adapted for measuring a movement of crop material downstream of the bale chamber, said downstream crop material measurement system comprising a calibration wheel for continuously measuring the movement of the crop material downstream of the bale chamber, the calibration wheel engaging the crop material downstream of the bale chamber and to rotate as the crop material is being moved downstream of the bale chamber;
a sensor adapted for measuring the rotation of the calibration wheel;
a measurement and calculation tool adapted for:
continuously measuring a movement of crop material in the bale chamber by a rotatable device engaging the crop material;
determining at least one calibration parameter using:
the movement of the crop material downstream of the bale chamber as measured by the downstream crop material measurement system; and
the measured movement of the crop material in the bale chamber; and
determining a length of a bale being formed in the bale chamber using the at least one calibration parameter and the measured movement of the crop material in the bale chamber, wherein the crop material measurement system comprises a plurality of calibration wheels arranged at different positions; and
a trigger adapted for triggering a tying mechanism of the baler when the length of the bale being formed in the bale chamber reaches a predetermined value.

8. The system according to claim 7, wherein the measurement and calculation tool comprises:
a measuring wheel for measuring the movement of the crop material in the bale chamber, the measuring wheel adapted to engage the crop material in the bale chamber and to rotate as the crop material is being moved in the bale chamber; and
a wheel sensor adapted for measuring the rotation of the measuring wheel.

9. A baler comprising the bale measuring system according to claim 7.

10. A measuring method for a rectangular baler having a bale chamber in which bales are formed, the method comprising the steps of:
continuously measuring a movement of a crop material downstream of the bale chamber by a rotatable device engaging the crop material as the crop material moves backward in the baler;
continuously measuring a movement of the crop material in the bale chamber by a rotatable device engaging the crop material using a measurement and calculation tool;
calibrating the measurement and calculation tool by determining at least one calibration parameter based on the measured movement of the crop material downstream of the bale chamber and the measured movement of the crop material in the bale chamber;
calculating a length of a bale being formed in the bale chamber using the calibrated measurement and calculation tool, the step of calculating comprising calculating a length of the bale being formed in the bale chamber based on the at least one calibration parameter and the measured movement of the crop material in the bale chamber; and
triggering a tying mechanism of the baler when the length of the bale formed in the bale chamber reaches a predetermined value.

11. The method of claim 10, wherein the steps of determining at least one calibration parameter is further based on a comparison of the measured movement of the crop material downstream of the bale chamber and the measured movement of the crop material in the bale chamber, the comparison performed by the measurement and calculation tool, wherein the steps of measuring are performed at the same time.

12. The method of claim 11, wherein the steps of measuring are started a predetermined time since a beginning of formation of the bale in the bale chamber and are stopped when a predetermined value for the movement of the crop material downstream of the bale chamber or the crop material in the bale chamber is reached.

13. The method of claim 11, wherein the steps of measuring are performed between a first time corresponding to a first number of strokes performed by the baler since a beginning of formation of the bale, and a second time corresponding to a second larger number of strokes performed by the baler since the beginning of the formation of the bale.

14. The method of claim 10, wherein:
- the step of measuring the movement of the crop material downstream of the bale chamber comprises measuring a movement of a first bale downstream of the bale chamber as the first bale moves backward in the baler;
- the step of calculating further comprises calculating, using the calibrated measurement and calculation tool, a length of the first bale downstream of the bale chamber based on the measured movement of the first bale downstream of the bale chamber;
- the step of calibrating the measurement and calculation tool further comprises determining the at least one calibration parameter based on a comparison of the calculated length of the first bale in the bale chamber with the calculated length of the first bale downstream of the bale chamber; and
- the step of calculating further comprises a step of calculating a length of a second bale being formed in the bale chamber using the calibrated measurement and calculating tool.

* * * * *